United States Patent [19]

Scuero

[11] Patent Number: 5,143,480
[45] Date of Patent: Sep. 1, 1992

[54] METHOD FOR PROTECTING DAMS, WITH PRESSURELESS DEHYDRATION BY CONDENSATION AND DRAINAGE OF THE WATER IN THE DAM BODY

[75] Inventor: Alberto Scuero, Turin, Italy

[73] Assignee: Sibelon S.r.l., Novara, Italy

[21] Appl. No.: 701,126

[22] Filed: May 16, 1991

[30] Foreign Application Priority Data

May 29, 1990 [IT] Italy .................. 20462 A/90

[51] Int. Cl.⁵ .................................. E02B 7/04
[52] U.S. Cl. ........................ 405/107; 405/109; 405/116
[58] Field of Search ............ 405/53, 54, 50, 107, 405/109, 116

[56] References Cited

U.S. PATENT DOCUMENTS

| 1,808,904 | 6/1931 | Noetzli | 405/116 |
| 2,128,681 | 8/1938 | Logeman | 405/116 X |
| 4,371,288 | 2/1983 | Borca et al. | 405/53 |
| 4,473,982 | 10/1984 | Monari | |
| 4,519,172 | 5/1985 | Ristow | |
| 4,733,989 | 3/1988 | Harriett | 405/50 X |
| 4,815,892 | 3/1989 | Martin | 405/50 X |
| 4,913,583 | 4/1990 | Ledeuil | 405/107 |

FOREIGN PATENT DOCUMENTS

| 0329060 | 8/1989 | European Pat. Off. . | |
| 0358164 | 3/1990 | European Pat. Off. . | |
| 1163736 | 2/1964 | Fed. Rep. of Germany | 405/54 |
| 1634140 | 4/1971 | Fed. Rep. of Germany . | |
| 3831188 | 3/1990 | Fed. Rep. of Germany . | |

Primary Examiner—David H. Corbin
Attorney, Agent, or Firm—Young & Thompson

[57] ABSTRACT

A method and an assembly for protecting dams according to which dehydration of the dam body is obtained as a result of the differences in temperature between the concrete structure and a steam barrier defined by a water-proof protective sheathing. The condensation water and any seeping water is eliminated by means of a drainage channel system at atmospheric pressure.

16 Claims, 3 Drawing Sheets

METHOD FOR PROTECTING DAMS, WITH PRESSURELESS DEHYDRATION BY CONDENSATION AND DRAINAGE OF THE WATER IN THE DAM BODY

BACKGROUND OF THE INVENTION

The invention relates to a method and a system for protecting dams, designed to allow their dehydration by means of running and condensation of the water present in the dam body and pressureless drainage thereof.

At present, the upstream surface of dams and similar hydraulic structures tends to be protected in order to prevent water seeping throughout the body of the dam. In this connection, protective coatings consisting of concrete, paint or other covering material which adhere completely to the visible surface of the structure are applied. Furthermore, in order to eliminate the water already present in the dam body or any water which has seeped, vertical channels are provided at a predetermined distance from the upstream surface in the dam itself. These systems do not solve the problem adequately since conventional coatings are subject to rapid deterioration both due to climatic and environmental factors and for other reasons. Moreover, the use of vertical channels in the dam body has proved to be of limited effectiveness, owing to the known phenomenon of carbonation of the concrete with time, these channels tending to become blocked and preventing drainage of the water.

SUMMARY OF THE INVENTION

The present invention therefore relates to a method for protecting dams, which makes use of the presence of several elements which facilitate the formation of water condensate on the upstream surface, drawing off, from the dam body, water also present in the form of steam and moisture. The key element of the system is the presence, on the upstream or exposed surface of the dam, of a steam barrier preferably consisting of steam or water proof sheathing or covering. The phenomenon of condensation generally occurs on the inner surface of the vapour barrier on account of the difference in temperature occurring between the two structures, namely between the water proof covering and the masonry work, when the water level changes in the basin subtended by the dam. With time, the temperature of the masonry work tends to become the same as that of the water inside the basin and, therefore, frequently in the case of basins in alpine climates, tends to reach temperatures close to 0° C. The steam proofing barrier therefore reaches temperatures close to those of the water and the masonry work. When the level of the water falls inside the basin, following use, the proofing barrier remains directly exposed to solar radiation and to the ambient temperature. Owing to the thermal conductivity of the material used for construction of the barrier, and its limited thickness, compared to that of the masonry work, the steam barrier, particularly during the hot months, rapidly reaches temperatures far higher than those of the masonry work and, consequently, of the steam present in the pores and interstices of the wall.

As a result of the known physical phenomenon, said steam tends to migrate into the zones where the temperature is higher, i.e. towards the steam barrier where it condenses on account of the low nocturnal temperatures, returning into its liquid state.

The condensation water, in the liquid state, is collected at the base of the dam owing to the presence or the formation of an air chamber between opposite surfaces of the proofing sheathing forming the steam barrier and the masonry work. The formation of said air chamber is possible because the sheathing is fastened separately to the dam body by means of mechanical fastening means which allow dimensional variation thereof, while keeping it in position. Obviously, the maximum advantage is obtained by using, as a steam barrier, a covering sheath which at the same time is both proofing with respect to the water present in the basin and elastically yielding, so as to absorb the dimensional variations created by the condensation water flowing towards the base of the dam, the said dimensional variations being opposed by the mechanical fastening means and the pretensioning.

Flowing of the condensation water is facilitated if other components are also used, such as a draining layer consisting of one or more combined structures made of a water-permeable synthetic material, a geotextile and/or geo-mesh, and a set of vertical and uniformely spaced apart channels covering the entire upstream surface, from upper rim to the base of the dam.

These vertical channels are connected to a drainage collector which can be partially closed and which, in turn, normally discharges this water into an underground conduit where it is quantitatively processed and subsequently discharged downstream of the entire dam.

The invention foresees, in addition to the use of a proofing and draining geocomposite material, for a draining layer which is combined or arranged on the internal surface of a proofing layer, a set of pairs of metal profiles which, arranged vertically and spaced apart at a generally constant distance, enable numerous advantages and functions to be achieved. In particular, these profiled sections are in the form of hollow structures unaffected by the external hydraulic pressures and therefore form channels which are pressureless or at a pressure equivalent to atmospheric pressure, thereby facilitating rapid elimination of the drainage water and at the same time preventing the latter from remaining between the dam body and the protective sheathing and, on account of the very low atmospheric temperatures, being transformed into ice with possible reduction or total interruption of the draining function. These profiled sections, in addition to fastening also allow pretensioning of the sheathing made necessary by the need to have a steam barrier which is proofing and which is elastically yieldable with respect to the upstream surface of the dam to be protected. This pretensioning also allows the proofing sheathing to be fastened so as to be permanently planar and thus free from pockets, bulges or other defects which would adversely affect its efficiency in the event of ice forming.

The proofing covering is supported in continuous lines and not at points, thus making it possible to associate a mechanical protection with the proofing barrier, achieved by means of rigid elements, which may even be of considerable thickness and which allow the effects of random mechanical damage by floating objects or wilful damage to be reduced to a minimum.

Finally, these metal sections for fastening the proofing sheathing allow, in new structures which for example make use of rolled and compacted concrete technology, shuttering of the cast concrete using the said vertical sections as anchoring elements or as integral part of the said shuttering, as well as installation, underwater, of the entire system described, without having to empty the basin subtended by the dam, a series of mechanical operations merely being necessary for said installation.

The object of the present invention is also to allow the proofing sheathing to be replaced very rapidly in the event of it no longer being able to perform its function and having to be replaced by a new sheathing. The mechanical anchoring system therefore allows this replacement to be carried out very rapidly and at relatively reduced cost and even in atmospheric conditions which are unfavourable for other systems.

These and other objects of the method and the assembly for protecting hydraulic structures in accordance with the present invention can be achieved by means of the characteristic features of the main claim; further characteristic features are described in the successive dependent claims.

BRIEF DESCRIPTION OF THE DRAWINGS

The general features and innovative principles of the invention will be described in greater detail hereinbelow with reference, by way of example, to the accompanying drawings in which.

DESCRIPTION OF THE INVENTION

Figure 1:
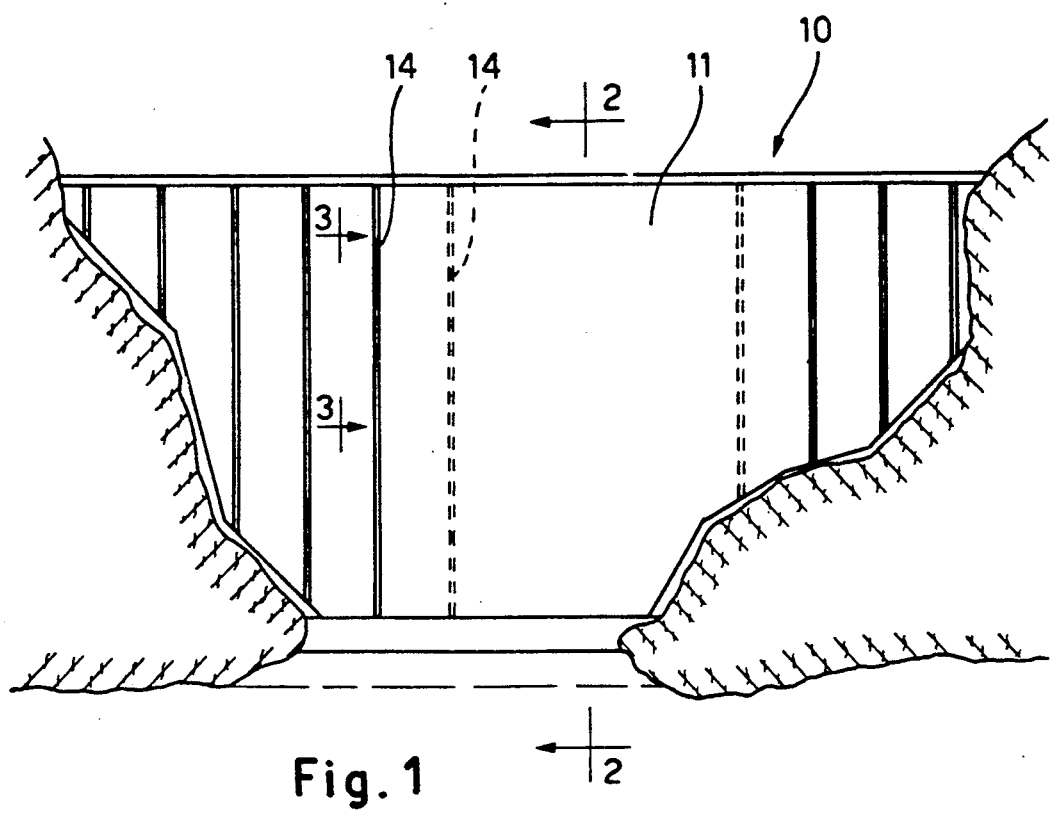
FIG. 1 shows the front view of a generic type of dam from the water collecting basin side.
Figure 2:
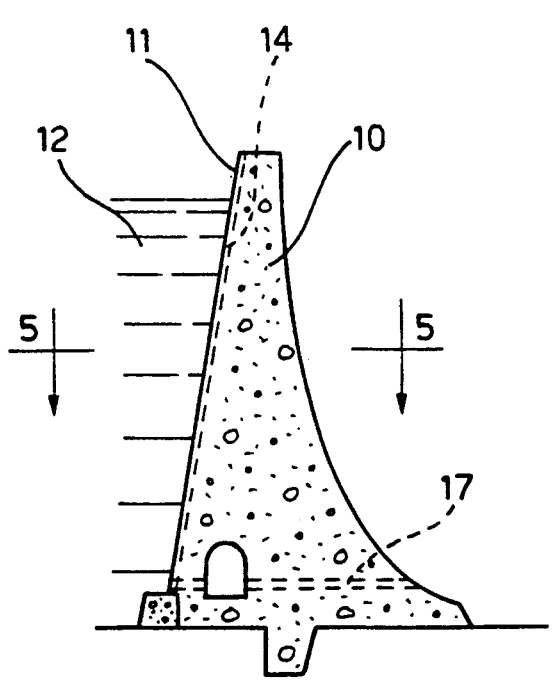
FIG. 2 shows, in schematic form, a sectional view along the line 2—2 of FIG. 1.

FIG. 1 shows a generic type of dam 10, the upstream surface 11 of which, intended to come into contact with the water 12 in the basin, is provided with a suitable proofing protection means 13 also defining a steam barrier consisting for example of a covering composed of sheets of synthetic material simply fastened mechanically to the surface 11 along continuous parallel lines 14, as shown schematically in FIGS. 1 and 2.

The proofing covering 13 must be fastened to the masonry structure 10 so as to allow pressureless drainage of the water present in the masonry work itself, whereby the said water may be already present in the latter or may seeping through accidental breakages in the protective covering, from the sides and from the base of the dam owing to the thrust of the hydrostatic pressure of the water present in the basin; this fastening operation must be effected preferably by means of a mechanical fastening system which also allows tensioning of the covering.

In order to allow drainage and dehydration of the masonry work, a non-pressurised air-space 15 for collecting the water is formed between the surface 11 to be protected and water proofing covering 13; this air-space 15 may be obtained for example by arranging the covering 13 spaced apart at a distance from the surface 11, for example as a result of swelling of the said covering 13 between continuous lines 14 of the mechanical anchoring system, or by arranging between the covering or water-proofing sheathing 13 and surface 11 of the masonry structure, a meshwork 16 or any other layer of water-permeable material suitable for performing and maintaining a non-pressurised air-space for drainage of the water; this air-space also allows dehydration of the masonry structure 10.

The non-pressurised, water which accumulates in the air-space 15 is conveyed downwards by providing, for example, suitable channelling along the anchoring lines 14 for the sheathing, thereby supplementing the drainage capacity of the said air-space 15, the water being then discharged externally, as schematically illustrated by 17 in FIG. 2.

As previously mentioned, the air-space 15 for draining and discharging the water which has seeped or which has condensed between the masonry structure 10 and the covering 13 can be realized in different ways by arranging one or more layers of drainage or water-permeable material between surface 11 and proofing protection means 13.

Figure 4:
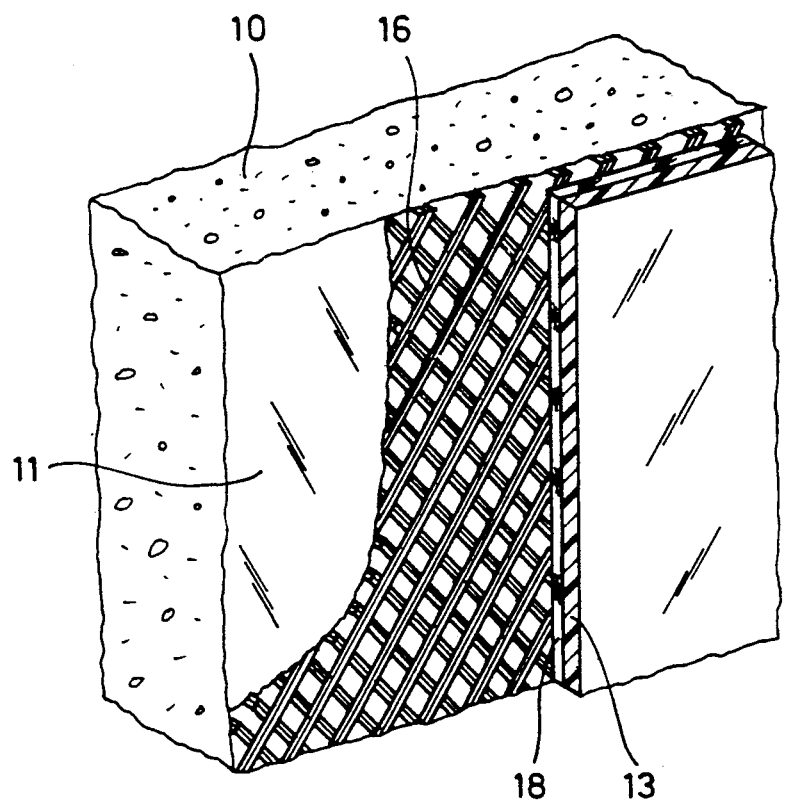
FIG. 4 shows a possible further embodiment of the invention.

A possible variation is schematically shown in FIG. 4, where the drainage air-space 15 is obtained by arranging, between the proofing covering 13 and the surface 11 to be protected, a meshwork structure 16, as already mentioned, and a layer 18 of textile material, for example in the form of felt, non-woven fabric or the like, combined beforehand with the proofing covering 13. Other variations or combined solutions are possible in addition to those shown, the general principle of the present invention remaining the same, namely providing an assembly and a set of means which jointly ensure the proofing of the surface of the hydraulic structure, for example the upstream surface of a dam, as well as a suitable water disposal system which envisages the formation of an air-space between the covering 13 and the above-mentioned surface 11 for the pressureless drainage of the water present in the masonry body due both to losses through the water-proofing covering and to condensation water; the drainage capacity of the air-space thus formed may be improved or supplemented by means of suitable channelling obtained via the said mechanical system for anchoring the covering 13, or in any other suitable way.

Figure 5:
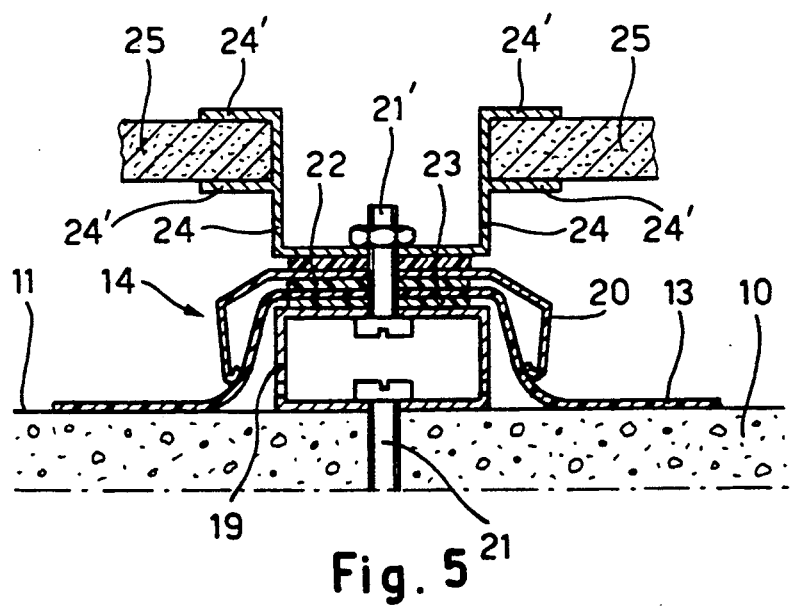
FIG. 5 shows an enlarged sectional view along the line 5—5 of FIG. 2.

FIG. 5 of the accompanying drawings shows by way of example a possible embodiment of the mechanical system for anchoring the water-proofing covering 13, designed to allow additional protection of the part of the covering 13 intended to be submerged; this ensures protection of a covering 13 against external knocks or blows, resulting for example from objects floating on the water or from acts of vandalism.

As shown in FIG. 5, for mechanical anchoring and tensioning of the sheets of proofing material 13, use may be made, for example, of a first metal section 19 intended to rest against the surface 11 of the masonry structure and fastened by means of screws, threaded bolts 21 or the like, and a second metal section 20 which is placed over the former, while the water-proofing covering 13 is disposed between one section and the other and is fastened and tensioned by moving the section 20 towards the section 19, for example by means of a set of sleeves, screws and threaded bolts 21' projecting from the concrete. Seals 22 and 23 may be arranged between the covering 13 and the metal sections 19, 20 so as to ensure a sealing effect in the region of the holes through which the screws or threaded anchoring bolts 21 pass.

In combination with the outer section 20 it may be envisaged using a third channel-shaped section 24 having pairs of lateral wings 24' defining the seats for accommodating panels 25 defining an additional protective wall positioned at a certain distance from the covering 13.

Obviously other solutions are possible: for example the outer section 20 and the additional section 24 could be combined in a single H-shaped section with the legs suitably formed so as to allow both anchoring and tensioning of the covering or protective sheathing 13, and supporting of the additional protective wall 25. The third section 24 or part equivalent thereto could also be dispensed with; in this case, for the necessary waterproofing effect, the seals 22 and 23 could also be dispensed with and in place of them a proofing strip, not shown, made of the same material or a material similar to covering 13 could be used, which covers and runs along all the sections and is fixed by means of a suitable adhesive to the covering or protective sheathing 13 itself.

Figure 6:
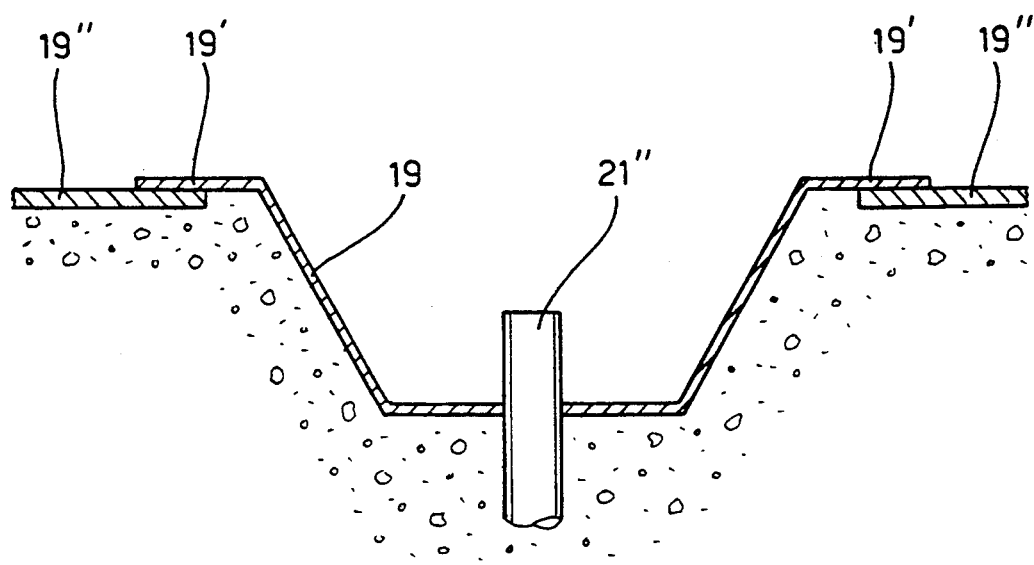
FIG. 6 shows a further embodiment.

FIG. 6 shows a variation of the section 19 for effecting anchoring to the dam, particularly suitable for forming a support part or an integral part of shuttering. In fact, in the case of new structures, the section 19 has a channel-type configuration or omega-shaped cross-section with lateral wings 19' for supporting and anchoring the panels 19" of a shuttering, before the concrete is cast; in this case, the threaded bolts 21" for fastening the section 19 could be directly embedded in the concrete and could also be used for fastening, in an adjustable manner, the second suitably shaped section 20. Advantageously, the sections 19 and 20 may form part of the non-pressurised channelling system for discharging the condensation water.

In all cases, a protection system for dams is achieved, which, owing to the presence of a steam barrier defined by the external protective sheathing, allows efficient and rapid dehydration, by means of condensation, of the moisture and steam present in the interstices of the concrete, as well as drainage, without pressure, of the water accumulating in the air-space formed between the opposing surfaces of the dam and its protective sheathing.

Figure 3:
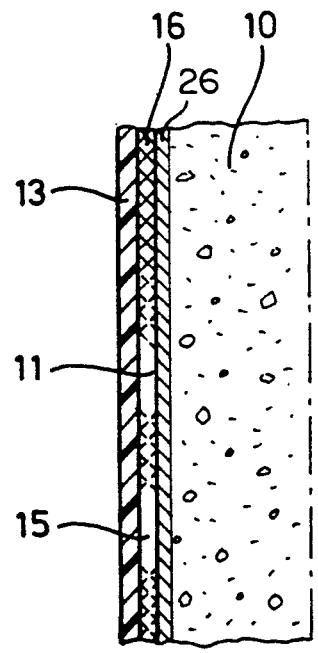
FIG. 3 is an enlarged detail along the line 3—3 of FIG. 1.

Other variations of the system are possible; for example, the sealing effect of the protective sheathing forming the steam barrier could be monitored by means of a network of electrical conductors arranged behind the sheathing itself, for example as shown schematically at 26 in FIG. 3, verifying that the latter is intact by means of a suitable transducer which, using the method of geophysical and geoelectric measurements, is able to detect the variation in conductivity of the materials when an electric current is applied to the poles formed by the transducer and the network of electrical conductors mentioned above.

That is claimed is:

1. Method for the protection and pressureless drainage of water present in a hydraulic concrete structure of a dam body and similar hydraulic works, according to which a waterproof protective sheathing is provided and stretched onto a surface of said hydraulic structure, the improvement comprising the steps of:
   providing an air space between said surface of the structure and an elastically yieldable protective sheathing defining a steam barrier;
   drawing off water from said dam body by causing the migration of the water in steam form into said air space;
   condensing said steam by contacting it with said steam barrier;
   collecting condensed water in said air space; and
   outwardly discharging said condensed water from said air space by non-pressurized water channel means provided on the surface of said hydraulic structure.

2. Method according to claim 1, in which said steam barrier consists of waterproofing sheet material mechanically fastened along parallel lines, arranged on the surface of the hydraulic structure to be protected.

3. Method according to claim 1, in which said air space comprises at least one layer of water-permeable material arranged between said surface of the dam body and said protective sheathing.

4. Method according to claim 3, in which said layer of water-permeable material is selected from the group consisting of a material in meshwork form, a textile material, and combinations thereof.

5. Method according to claim 1, in which said channel means are provided along parallel lines used for mechanically anchoring the protective sheathing.

6. Method according to claim 1, in which provision is made of an additional protective wall arranged parallel to, and spaced apart from, the steam barrier.

7. Method according to claim 6, in which said additional protective wall consists of panels fastened to profiled elements for anchoring the sheathing defining the steam barrier.

8. Assembly for the protection and pressureless drainage of water in a concrete structure of a dam body, comprising: a covering made of flexible water-proofing material, said covering defining a steam barrier; fastening means for mechanically fastening said covering to the surface of the dam body to be protected, and air space means for providing an air space for collection of condensed water between said covering and said surface of the dam body, and non-pressurized channel means for discharge of water from said air space.

9. Assembly according to claim 8, in which said means defining the air space is a water-permeable material selected from the group consisting of a material in meshwork form, a textile material, or combinations thereof.

10. Assembly according to claim 8, in which said means for mechanically fastening the covering comprise profiled metal sections defining non-pressurized channel system.

11. Assembly according to claim 10, further comprising an inner channel section, an outer channel section fitting over the inner channel section, means for tightening one section towards the other and for tensioning the covering, and sealing means for forming a seal along said sections.

12. Assembly according to claim 11, in which said sealing means comprise seal members arranged between each section and the protective sheathing.

13. Assembly according to claim 11, in which said sealing means comprise a strip of impermeable material fixed to the protective sheathing along said sections.

14. Assembly according to claim 11, in which a third additional section combined with said outer section comprises lateral supporting wings for a protective wall spaced apart at a distance from the sheathing.

15. Assembly according to claim 11, in which said inner section constitutes part of a shuttering system.

16. Assembly according to claim 8, further comprising a network of electrical conductors positioned behind the protective sheathing, for monitoring the sealing effectiveness of the protective sheathing.

* * * * *